April 11, 1933.  W. SHAKESPEARE, JR  1,903,559
FISHING REEL
Filed Oct. 1, 1928
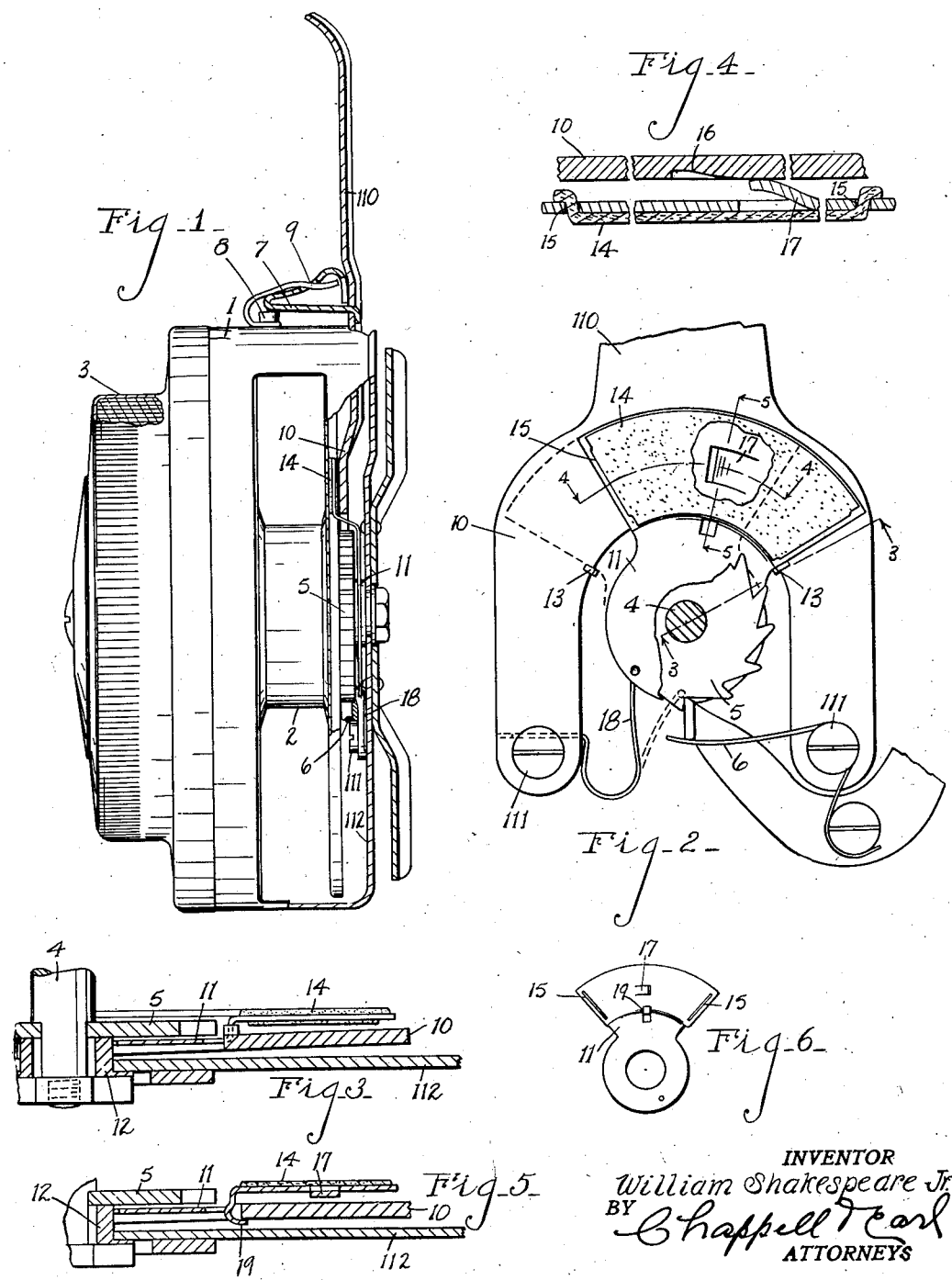
INVENTOR
William Shakespeare Jr.
BY Chappell Earl
ATTORNEYS Patented Apr. 11, 1933

1,903,559

UNITED STATES PATENT OFFICE

WILLIAM SHAKESPEARE, JR., OF KALAMAZOO, MICHIGAN, ASSIGNOR TO SHAKESPEARE COMPANY, OF KALAMAZOO, MICHIGAN

FISHING REEL

Application filed October 1, 1928. Serial No. 309,579.

My improvements are especially designed by me for embodiment in the type of spring winding fishing reel illustrated in the patent to Russell, No. 1,510,904, dated October 7, 1924, and I have illustrated the same as I have embodied them in such structure in the accompanying drawing. My improvements are, however, readily adapted and desirable for use in other types of fishing reels.

The main objects of this invention are:

First, to provide an improved brake means which facilitates the stripping of the line in fly casting and the like.

Second, to provide a brake which is automatically released by a pull on the line so that the line can be pulled freely from the reel and the brake acts upon releasing tension on the line to prevent the spring winding up the line until the brake mechanism is released.

Objects pertaining to details and economies of my invention will definitely appear from the description to follow. The invention is defined in the claims.

A structure which embodies the features of my invention is clearly illustrated in the accompanying drawing in which:

Fig. 1 is a side view of a spring winding fishing reel embodying the features of my invention, portions being sectioned and broken away for convenience in illustration.

Fig. 2 is an inside fragmentary view of the brake mechanism.

Fig. 3 is a detail view partially in section on line 3—3 of Fig. 2.

Fig. 4 is a detail section on line 4—4 of Fig. 2.

Fig. 5 is a detail section on line 5—5 of Fig. 2.

Fig. 6 is a side view of the brake shoe member.

Referring to the drawing, the casing designated generally by the numeral 1 is designed to receive the spool 2 and the winding spring which is housed within the spring casing 3. The spool staff 4 is operatively associated with the spring mechanism, the staff being provided with a ratchet 5 and coacting pawl 6. These parts are in the embodiment illustrated substantially those shown in the Russell Patent No. 1,510,904 referred to and are, therefore, not detailed herein. As stated, my improvements relate to the brake mechanism.

The brake lever 10 is formed of spring material and is forked at its inner ends to embrace the staff and certain parts mounted thereon. The ends of the fork are secured by the screws 111 to the side walls 112 of the casing. The spring of the lever acts to urge it to brake engaging position. The latch 7 coacting with the detent 8 holds the brake lever in brake disengaging position.

The spring 9 acts to disengage the latch although the tension of this spring is such that when the latch is in engagement with the detent the lever is locked in disengaged position until an outward pull or pressure on the finger-piece 110 of the lever allows the spring to swing the latch to disengaging position as shown in Fig. 1.

The brake shoe 11 is mounted on the bushing 12 carried by the casing end plate 112 for limited axial movement relative to the spool and also for oscillating movement in a plane transverse to the axis of the spool. The arms of the brake lever are provided with stops 13 limiting the movement of the brake shoe. The scope of this movement is indicated by dotted lines in Fig. 2, the brake shoe being shown in its engaged position by full lines and in disengaged position by dotted lines.

The facing 14 of the brake shoe is in the form of a segment, the ends of the facing being arranged through slot-like holes 15 in the shoe. The brake lever is provided with a cam 16 while the brake shoe has a coacting cam 17. These cams are brought into engagement by the rotative movement of the brake shoe, thereby forcing the brake shoe into clutching engagement with the flange of the spool. A spring 18 tends to urge the brake shoe to engaging position.

When the brake lever is in engaging position the brake shoe is held against the spool but with sufficient friction so that on the rearward or line winding rotation of the spool, the shoe is moved to bring the actuating cams into engagement, thereby stopping the rearward or line winding rotation of the spool.

However, on the stripping or pulling out of the line, which rotates the spool in the opposite direction, the spool is automatically released.

When it is desired to render the brake entirely inoperative the brake lever is pulled outwardly and the latch 7 engaged, thereby entirely releasing the spool.

To insure positive engagement of the brake shoe when the brake lever is shifted to releasing position, the brake shoe is provided with a tongue 19 which engages the lever—see Fig. 5—the tongue engaging the outer side of the lever so that while the shoe has a limited movement independent of the lever it is positively retracted when the catch 7 is engaged with its keeper.

In casting particularly fly casting, it is necessary to have free line and in ordinary spring winding reels this is stripped off with the brake set, releasing the brake with one hand while stripping with the other, making perfect timing of the two hands necessary to prevent the stripped line from being retrieved or rewound. In spring winding reels embodying my improvements the line may be freely stripped off as the brake automatically releases and, further, in the event of a strike, the line or rod is not likely to be broken as the line only has the resistance of the spring; whereas, in spring winding reels of the type commonly employed, the line is subject to the friction of the set brake.

I have illustrated and described my improvements in an embodiment which I have found highly satisfactory. I have not attempted to illustrate and describe various embodiments and adaptations as I believe this disclosure will enable those skilled in the art to which my invention relates to embody or adapt the same as may be desired.

Having thus described my invention, what I claim as new and desire to secure by Letters Patent, is:

1. The combination in a spring winding reel, of a casing, a spool staff, a spool on said staff, a driving spring operatively associated with said spool, a brake lever of spring material mounted in said casing to project therefrom, a latch for holding said brake lever in released position, a brake shoe mounted on the side of said lever facing said spool for oscillating movement in coacting relation to said spool, said brake lever being provided with stops limiting the movement of said brake shoe, coacting cam members on said brake lever and brake shoe for actuating the brake on the winding movement of the spool, and a spring acting to move said brake shoe to cam engaging position.

2. The combination in a spring winding reel, of a casing, a spool staff, a spool on said staff, a driving spring operatively associated with said spool, a brake lever of spring material mounted in said casing to project therefrom, a latch for holding said brake lever in released position, a brake shoe mounted on the side of said lever facing said spool for oscillating movement in coacting relation to said spool, said brake lever being provided with stops limiting the movement of said brake shoe, and coacting cam members on said brake lever and brake shoe for actuating the brake on the winding movement of the spool.

3. The combination in a spring winding reel, of a casing, a spool staff, a spool on said staff, a driving spring operatively associated with said spool, a brake lever mounted in said casing to project therefrom, a latch for holding said brake lever in released position, a brake shoe mounted on the side of said lever facing said spool for oscillating movement in coating relation to said spool, coacting cam members on said brake lever and brake shoe for actuating the brake on the winding movement of the spool, and a spring acting to move said brake shoe to cam engaging position.

4. The combination in a spring winding reel, of a casing, a spool staff, a spool on said staff, a driving spring operatively associated with said spool, a brake lever mounted in said casing to project therefrom, a latch for holding said brake lever in released position, a brake shoe mounted on the side of said lever facing said spool for oscillating movement in coacting relation to said spool, and coacting cam members on said brake lever and brake shoe for actuating the brake on the winding movement of the spool.

5. The combination in a spring winding reel comprising a spool and a driving spring, of a brake comprising a brake shoe mounted for limited oscillating movement in a plane transverse to the axis of the spool, a brake lever mounted at the end of the spool, said lever and brake shoe being provided with coacting cam parts for actuating the brake shoe to engaging position on the winding movement of the spool, and a spring acting to move said brake shoe to cam engaging position.

6. The combination in a spring winding reel comprising a spool and a driving spring, of a brake comprising a brake shoe mounted for limited oscillating movement in a plane transverse to the axis of the spool, and a brake lever mounted at the end of the spool, said lever and brake shoe being provided with coacting cam parts for actuating the brake shoe to engaging position on the winding movement of the spool.

7. The combination in a spring winding fishing reel of a spool and a driving spring therefor, a brake comprising a brake shoe mounted to coact with the end of the spool and for limited oscillating movement in a plane transverse to its axis, cam means for forcing the brake shoe into engagement with the spool on the rotation of the spool in line winding direction, said brake shoe being automatically released on the unwinding rotation of the spool, a spring acting to yieldingly urge said brake shoe to engaging position, and means for locking said cam means in inoperative position.

8. The combination in a spring winding fishing reel of a spool and a driving spring therefor, a brake comprising a brake shoe mounted to coact with the end of the spool and for limited oscillating movement in a plane transverse to its axis, cam means for forcing the brake shoe into engagement with the spool on the rotation of the spool in line winding direction, said brake shoe being automatically released on the unwinding rotation of the spool, and means for locking said cam means in inoperative position.

9. The combination in a spring winding fishing reel of a spool and a driving spring therefor, a brake comprising a brake shoe loosely mounted for limited axial and oscillating movement in a plane transverse to the axis of the spool to frictionally engage the same, and means movable to and from operative position with which said brake shoe is automatically engaged and disengaged by the rotation of the spool.

10. The combination in a spring winding reel comprising a spool and a driving spring, a brake shoe mounted for limited oscillating movement in a plane transverse to the axis of the spool and for movement axially of the spool, and a brake lever mounted at the end of the spool, said brake lever and brake shoe being provided with coacting cam parts for actuating the brake shoe to engaging position on the line winding movement of the spool, said brake lever and shoe having co-engaging parts whereby the brake shoe may be held in inoperative position by said brake lever.

11. The combination with a spring winding fishing reel comprising a spool and a driving spring, of a brake means operatively associated with said spool, means whereby said brake is automatically actuated to effective braking pressure-removing position on the unwinding rotation of said spool, and manually operated means independent of the rotation of said spool for holding said brake in disengaged position.

12. In combination, a spring winding fishing reel comprising a rotatable driven member and a driving spring therefor, and a brake shoe mounted for limited oscillating movement in a plane transverse to the axis of said driven member to frictionally engage the same, means whereby said brake is automatically actuated to engaged position by the line winding action of the reel, means whereby the braking friction of said brake is automatically reduced by the line unwinding action of the reel, and manually operated means for releasing said brake independently of the rotation of said spool.

13. The combination in a spring winding fishing reel comprising a spool and a driving spring therefor, of a brake shoe mounted for limited oscillating movement in a plane transverse to the axis of the spool to frictionally engage the same and to be oscillated thereby, and means with which said shoe is engaged by its oscillating movement on the winding rotation of the spool, said shoe being oscillated from engagement with said means on the unwinding rotation of the spool.

14. The combination in a spring winding reel comprising a spool and a driving spring, of a brake means comprising a brake shoe mounted for oscillating movement in a plane transverse to the axis of the spool to frictionally engage the same, and means with which said brake shoe is automatically engaged by the winding rotation of the spool for actuating the shoe to spool engaging position.

15. The combination in a spring winding fishing reel comprising a spool and a driving spring, of a brake shoe mounted for limited oscillating movement in a plane transverse to the axis of the spool, and an abutment element for supporting said brake in spool engaging position, said brake being automatically oscillated to and from abutment engaging position by the rotation of the spool in opposite directions, means whereby the brake is disengaged when the reel is rotated in line unwinding direction, and means for releasing said brake independently of the rotation of said spool.

16. In a fishing reel, the combination of a support adapted to be attached to a fishing rod, a rotary spring drum for a fish line mounted on said support, a brake shoe normally in pressure contact with and offering frictional resistance to the rotation of said drum, means for mounting said shoe whereby the braking pressure of the shoe on the drum is reduced when the line is drawn out, and a hand-operable brake lever in operative connection with said shoe.

17. In a fishing reel, the combination of a support adapted to be attached to a fishing rod, a rotary spring drum for a fish line mounted on said support, a brake shoe normally exerting a pressure effecting frictional resistance to the rotation of said drum, means for pivotally mounting said shoe whereby the braking pressure of the shoe is reduced when said drum rotates in the direction opposite to that in which it is driven by said spring, and a hand-operable brake lever in operative connection with said shoe.

18. In a fishing reel, the combination of a support adapted to be attached to a fishing rod, a rotary spring drum for a fish line mounted on said support, a brake normally preventing rotation of said spring drum in the direction to wind the line thereon, means for mounting said brake whereby the braking pressure thereof is reduced when the line is drawn out, and hand-operable means for removing the braking effect of said brake to permit the line to be wound up by said spring drum.

19. The combination with a spring winding fishing reel comprising a spool and a driving spring therefor, of a brake means including the driven rotating element and a shoe coacting therewith, means acting to normally hold said shoe in light frictional engagement with said rotating element, cam means arranged so that the brake is automatically actuated to engaged position by the line winding action of the reel and returned to non-braking position by the line unwinding action of the reel, and a manually operated lever for releasing said brake.

20. The combination with a spring winding fishing reel comprising a spool and a driving spring therefor, of a brake means including the driven rotating element and a shoe coacting therewith, means acting to normally hold said shoe in light frictional engagement with said rotating element means whereby the spool is free for rotation in line-unwinding direction and the brake is automatically actuated to engaged position by the line winding action of the reel, and manually controlled brake releasing means independent of said spool.

21. The combination in a spring winding fishing reel comprising a rotatable driven member and a driving spring therefor, of a brake shoe operatively associated with said driven member, a spring acting to hold said brake shoe in light frictional engagement with said driven member, cam means arranged so that on the line winding action of the reel the shoe is moved into braking engagement with said driven member and returned again to non-braking position by the line unwinding action of the reel, and a manually operated brake release unassociated with said spool.

In witness whereof I have hereunto set my hand.

WILLIAM SHAKESPEARE, Jr.